United States Patent
Robotham, Jr. et al.

(10) Patent No.: US 7,885,308 B2
(45) Date of Patent: Feb. 8, 2011

(54) FREQUENCY-AGILE RF-POWER EXCITATION FOR DRIVING DIFFUSION-COOLED SEALED-OFF, RF-EXCITED GAS LASERS

(75) Inventors: W. Shef Robotham, Jr., Burlington, CT (US); Joel Fontanella, Tolland, CT (US)

(73) Assignee: Coherent, Inc., Santa Clara, CA (US)

( * ) Notice: Subject to any disclaimer, the term of this patent is extended or adjusted under 35 U.S.C. 154(b) by 28 days.

(21) Appl. No.: 12/416,908

(22) Filed: Apr. 1, 2009

(65) Prior Publication Data
US 2009/0296764 A1 Dec. 3, 2009

Related U.S. Application Data

(60) Provisional application No. 61/057,392, filed on May 30, 2008.

(51) Int. Cl.
*H01S 3/22* (2006.01)
*H01S 3/13* (2006.01)
(52) U.S. Cl. .................. 372/55; 372/29.01; 372/29.011
(58) Field of Classification Search .................. 372/55, 372/29.01, 29.011
See application file for complete search history.

(56) References Cited

U.S. PATENT DOCUMENTS

| 4,443,877 | A | | 4/1984 | Chenausky et al. |
|---|---|---|---|---|
| 4,451,766 | A | | 5/1984 | Angle et al. |
| 4,748,634 | A | | 5/1988 | Hesterman |
| 4,837,772 | A | | 6/1989 | Laakman et al. |
| 5,150,372 | A | | 9/1992 | Nourrcier |
| 5,556,549 | A | * | 9/1996 | Patrick et al. .................. 216/61 |
| 5,892,198 | A | * | 4/1999 | Barnes et al. .......... 219/121.54 |
| 6,181,719 | B1 | | 1/2001 | Sukhman et al. |
| 6,392,210 | B1 | * | 5/2002 | Jewett et al. ................. 219/663 |
| 2002/0107510 | A1 | * | 8/2002 | Andrews et al. .............. 606/10 |
| 2008/0204134 | A1 | | 8/2008 | Knickerbocker et al. |

* cited by examiner

*Primary Examiner*—Minsun Harvey
*Assistant Examiner*—Phillip Nguyen
(74) *Attorney, Agent, or Firm*—Morrison & Foerster LLP

(57) ABSTRACT

A gas discharge laser includes a laser housing including a laser gas and an electrode-assembly for lighting a discharge in the laser gas. The electrode assembly has a first resonant frequency when the discharge is not lit and a second resonant frequency when the discharge is lit. RF power delivering circuitry of the laser includes an arrangement for determining and recording the two resonant frequencies. RF power is applied to the electrodes at the first recorded resonant frequency to facilitate lighting of the discharge, and thereafter at the second resonant frequency to light and sustain the discharge.

21 Claims, 4 Drawing Sheets

FREQUENCY-AGILE RF-POWER EXCITATION FOR DRIVING DIFFUSION-COOLED SEALED-OFF, RF-EXCITED GAS LASERS

PRIORITY CLAIM

This application claims priority of U.S. Provisional Application No. 61/057,392, filed May 30, 2008, the complete disclosure of which is hereby incorporated by reference.

TECHNICAL FIELD OF THE INVENTION

The present invention relates to pre-ionization methods and apparatus for facilitating ignition of a gas discharge. The invention relates in particular to igniting a gas discharge in a radio frequency (RF) excited, hermetically sealed carbon dioxide ($CO_2$) laser.

DISCUSSION OF BACKGROUND ART

RF-excited, hermetically sealed, pulsed $CO_2$ lasers are gas discharge lasers widely used in material processing and laser machining applications such as via hole drilling in printed circuit boards and glass-plate scribing for TV screen manufacture. Such a laser includes a laser gas mixture including $CO_2$ and inert gases. A gas discharge is ignited in the laser gas to energize the $CO_2$ for providing optical gain. In order to be adaptable to a variety of applications, such a laser should be capable of operating in a wide variety of pulse formats including a wide range of constant pulse repetition frequencies (PRF) to random sequences of changing PRF. An RF-excited, hermetically sealed, pulsed $CO_2$ laser typically requires pre-ionization of the laser gas in order to provide near-immediate ignition of the discharge in response to a user command signal with minimal variation in delay time between receipt of the command pulse and the ignition. Response-delay time variations are commonly referred to as "pulse-time jitter" by practitioners of the art.

In an RF-discharge gas laser the RF resonant circuit (which includes the lasing gas between discharge electrodes) has a high Q and a higher resonant frequency when the discharge is un-lit. High Q is associated with high impedance at resonance. Once the discharge is lit, the impedance, and accordingly the Q, drops significantly and the resonant frequency of the RF circuit drops correspondingly. It is easier to achieve ignition of a gas discharge with a high-Q resonant circuit than with a low-Q resonant circuit. This resonant frequency-shift presents a problem in the design of RF excited $CO_2$ lasers, as the frequency of the RF supply to the electrodes must be selected to provide a compromise between optimum ignition effectiveness and efficiency of operation once the discharge is ignited (lit). The problem is complicated by the fact the longer a discharge is not lit the more difficult it is to reignite the discharge. The resonant-frequency-shift problem is described briefly below with reference to FIGS. 1A-C and FIGS. 2A-C.

FIG. 1A schematically illustrates partially in cross-section a typical arrangement 10 of a $CO_2$ laser-head. Laser head 10 includes gas housing and electrode assembly 11, including a hermetically sealed, metal enclosure 12 which contains a lasing-gas mixture including $CO_2$ and inert gases. Within enclosure 12 are elongated electrodes 14 and 16 parallel to each other parallel to each other and spaced apart by dielectric spacers 18. Spacers 18 are usually of a ceramic material such as aluminum oxide or beryllium oxide. RF power is delivered to the laser head from an RF power supply (RFPS), not explicitly shown, via an LC impedance matching network 20.

The matching network is usually adjusted for the RFPS to see a matched 50 Ohm (50Ω) load ($Z_0$) looking into an equivalent electronic resonant circuit of the electrode assembly where a discharge is lit between the electrodes. The RF power is connected to electrode 14, usually referred to as the "hot" electrode, via a hermetically sealed insulating feed-through 22. Electrode 16 is grounded via enclosure 12. A plurality of inductors $L_t$ (only one shown in FIG. 1A) are provided along the length of the hot electrode and ground. These are adjusted to maintain an about uniform distribution of RF voltage along the length of the electrodes. A detailed description of such inductors in a laser head is provided in U.S. Pat. No. 4,443,877.

Depending on the applied RF voltage and frequency either free-electrons are generated or a diffuse discharge is lit in space 24 between the electrodes. The laser is completed, as is known in the art by an optical resonator having a longitudinal axis generally perpendicular to the plane of the drawing. It should be noted, here, that while laser head 10 generally represents a so-called slab laser, in which a laser mode is constrained in one transverse axis by the electrodes, principles discussed herein are equally applicable to any other gas laser that has waveguide modes of free-space Gaussian modes.

FIG. 1B schematically illustrates an equivalent electronic resonant circuit of laser head 10 when RF power is applied to electrode 14 but a discharge is not lit between the electrodes. $C_{ft}$ and $L_{ft}$ represent capacitive and inductive reactance, respectively, associated with the hermetically sealed RF feed-through 22. Inductance $L_t$ is discussed above. Resistance $R_t$ is resistance associated with this inductance. $C_e$ is a capacitance associated with the electrodes and ceramic spacing material therebetween.

FIG. 1C schematically illustrates an equivalent electronic resonant circuit of laser head 10 when RF power is applied to electrode 14 and a discharge is lit between the electrodes. The equivalent resonant circuit is similar to that in the unlit condition with an additional capacitance $C_s$ and a resistance $R_d$ in series. $C_s$ is a capacitance created by a sheath of electrons generated just beneath "hot" electrode 14 when the electrodes are energized with RF power. $R_d$ is a resistive loading provided by ionized gas between the electrodes. This sheath capacitance and the lit-discharge resistance are causes of the shifting of the resonant frequency between the unlit and lit discharge conditions. The existence of the resistance $R_d$ is a reason why the equivalent resonant circuit in the lit-discharge condition has a low Q.

FIG. 2A graphically schematically illustrates relative impedance as a function of frequency for the unlit-discharge (solid curve) and lit-discharge (dashed curve) resonant circuits of FIGS. 1B and 1C, respectively. It can be seen that the difference Z' between a peak impedance $Z_{UL}$ at a frequency $f_{UL}$ for the unlit-discharge circuit and a peak impedance $Z_L$ at a frequency $f_L$ for the lit-discharge circuit is about an order of magnitude. An operating RF frequency of the laser of 100 megahertz (MHz) is assumed arbitrarily.

FIG. 2B graphically schematically illustrates relative reactance (imaginary part of the impedance) as a function of frequency for the unlit-discharge (solid curve) and lit-discharge (dashed curve) resonant circuits of FIGS. 1B and 1C. It can be seen that at the two resonant frequencies of FIG. 2 the reactance passes through zero for each of the curves. At this zero crossing the RF power delivered to the electrode assembly of the laser is deposited entirely in the discharge resistance and any other resistance that is included in the electrode assembly.

FIG. 2C graphically schematically illustrates reflected RF power (from the impedance-matching network) as a function of frequency for the unlit-discharge (solid curve) and lit-discharge (dashed curve) resonant circuits of FIGS. 1B and 1C. It can be seen that at the two resonant frequencies of FIG. 2C the reflected power in each case is at a minimum. In the unlit discharge condition, however, the minimum is extremely sharp and narrow.

The resonant frequency shift between the lit-discharge and unlit-discharge conditions of a gas-laser electrode-assembly has been recognized in the prior-art and schemes for dealing with the shift have been proposed. By way of example, in U.S. Pat. No. 5,150,372, a scheme is proposed wherein frequency of the RF power from an RFPS is frequency-swept downward from a frequency higher than the resonant frequency of the unlit-discharge condition, through the resonant frequency of the unlit-discharge condition, to the resonant frequency of the lit-discharge condition. The discharge is lit near the end of the sweep and the RF frequency is maintained at the end-frequency (lit-discharge frequency) while laser radiation is being delivered.

It will be evident from FIG. 2C that a problem with this approach is that, during the period of the sweep, the frequency is at some value other than the actual resonant frequency which will mean that there is a significant reflected RF power during the sweep. This will be the case every time a laser radiation pulse is required. This reflected power places additional stress on the RFPS. The reflected RF power results in few free electrons generated in the lasing gas which could result in erratic discharge ignition. It is also possible that continually subjecting the RFPS to the reflected power could cause early deterioration of components of the RFPS.

Another dual-frequency scheme is described in U.S. Pat. No. 6,181,719. Here, two separate sources of RF pulses are provided with the pulses amplified by a common RF amplifier. A solid-state switching arrangement connects either one or the other source to the amplifier. The first source is connected to the amplifier for providing pulses at about the unlit-discharge resonant frequency for providing pre-ignition. When laser output is required the second source is connected to the amplifier.

It has been determined by the inventors of the present invention that the frequency at which the very sharp minimum of reflected power occurs for the unlit-discharge condition can vary significantly between lasers of the same model. That is to say, slight variations in components, assemblies, gas composition, or gas pressure, which are otherwise within manufacturing tolerances, can produce significant variations in the unlit-discharge resonant frequency. Accordingly, providing a separate RF frequency source at some nominal value of this frequency for a particular model of a laser will mean that for most lasers of that model produced the actual unlit discharge resonant frequency will be different from the nominal frequency. This will mean that for those lasers the above discussed potential adverse effects of reflected RF power may be encountered to some degree. There is a need for a dual-frequency discharge ignition approach that can accommodate variations within a group of lasers of the unlit-discharge resonant frequency.

SUMMARY

In one aspect of the present invention, a gas discharge laser comprises a laser housing including a laser gas and an electrode-assembly for lighting a discharge in the laser gas. The electrode assembly has a first resonant frequency when the discharge is not lit, and a second resonant frequency when the discharge is lit. The electronic circuitry is arranged to determine and record at least the first resonant frequency, apply RF power to the electrodes at the recorded first resonant frequency for a first predetermined time period insufficient to light a discharge in the laser gas but sufficient to create sufficient free electrons in the gas to facilitate lighting of the discharge, and thereafter light the discharge by applying RF power to the electrodes at the second resonant frequency.

In a preferred embodiment of the invention the electronic circuitry is also arranged to determine and record the second resonant frequency. By providing the laser with circuitry for determining particularly the first (unlit-discharge) resonant frequency for that particular laser, the above discussed problems of variations of the unlit-discharge resonant frequency between lasers of a given model are avoided. The monitoring and recording of the lit and unlit discharge resonant frequencies can be carried out by a few simple, readily-available electronic components in a few seconds, as will be evident from the detailed description of the invention presented herein below.

DETAILED DESCRIPTION OF THE INVENTION

Figure 3:
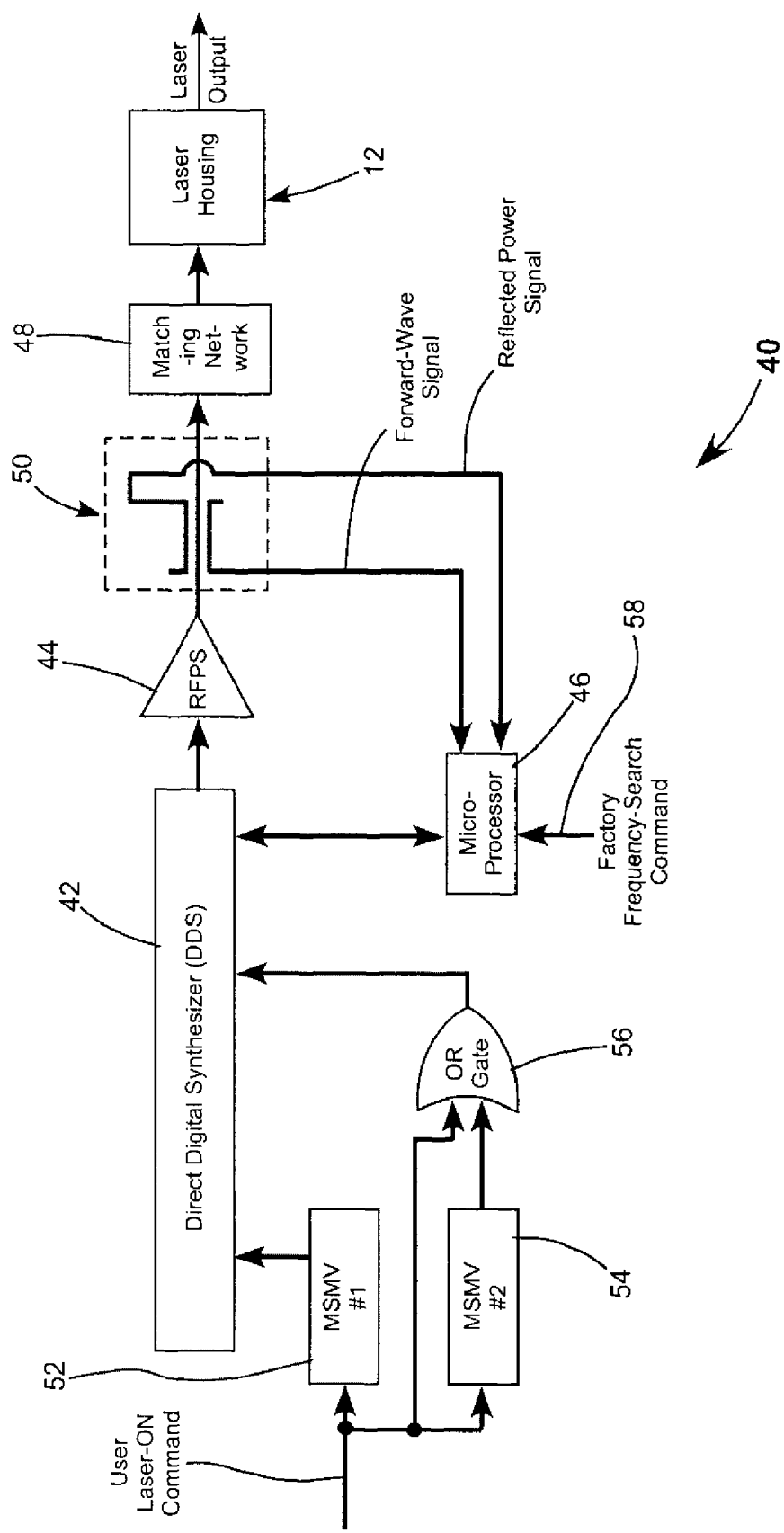
FIG. 3 schematically illustrates a preferred embodiment of a gas laser in accordance with the present invention electronic circuitry arranged for determining and recording unlit-discharge and lit-discharge resonant frequencies of an electrode assembly and applying RF power at the recorded frequencies in sequence to the electrode assembly.

FIG. 3 and FIGS. 4A-E schematically illustrate a preferred embodiment 40 of a gas-discharge ($CO_2$) laser in accordance with the present invention. FIG. 3 schematically illustrates the laser including inventive electronic circuitry in block-diagram form. FIG. 4 is a timing diagram schematically illustrating a preferred functioning of the electronic circuitry.

Referring first to FIG. 3, apparatus 40 includes a direct digital frequency synthesizer (DDS) 42, in communication with an RF power supply (RFPS) 44. In this arrangement, the DDS provides a digitally derived RF frequency signal having any value selected within a predetermined range. The RFPS is an RF amplifier having sufficient bandwidth to amplify signals within the predetermined frequency range.

Figure 1A:
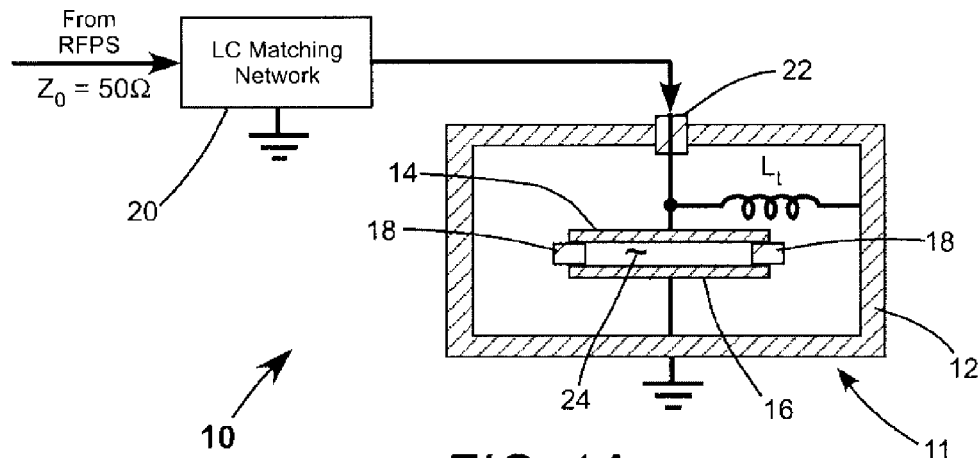
FIG. 1A schematically illustrates partially in cross-section prior-art gas-laser apparatus including a $CO_2$ laser-head including an electrode assembly contained within a hermetically sealed enclosure containing a laser-gas mixture with RF power being applied to the electrode assembly via an impedance matching network.
Figure 1B:
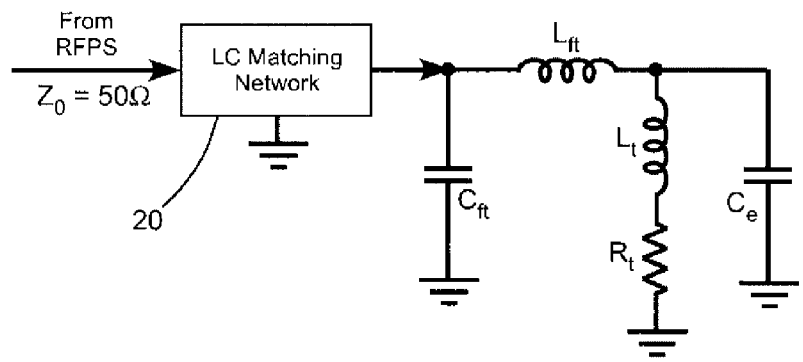
FIG. 1B schematically illustrates an equivalent electronic circuit of the electrode assembly of FIG. A when the RF power to the electrode assembly does not light a discharge in the laser-gas.

The DDS is in communication with a microprocessor (MP) 46 which preferably includes an electrically erasable read-only memory (EEPROM) for electronic storage. Output of the RFPS is connected to an LC matching (impedance-matching) network 48 via a directional coupler sensor 50. The LC matching network is connected to the laser discharge housing 12, i.e., to a "hot" discharge-electrode within the housing, similar to electrode 14 of FIG. 1A. Directional coupler sensor 50 provides for monitoring the connection between RFPS 44 and LC matching network. Sensor 50 monitors both the forward RF-wave (power) delivered to the matching network and the reflected RF-wave (power) from the matching network. Monitored values are communicated to microprocessor 46.

ON-commands are delivered simultaneously to "one shot" mono-stable multi-vibrators (MSMVs) 52 and 54 (also designated MSMV #1 And MSMV #2, respectively, in FIG. 3), and to a logic OR-gate 56. Such MSMVs include amplifiers cross coupled by resistors and capacitors, and are triggered from a stable state to an unstable state by either the rising (positive) edge or falling (negative) edge of a command pulse. The MSMVs return to the stable state, without further triggering, after a time determined by the value and arrangement of the capacitors and resistors.

MSMV 52 communicates with DDS 42 for selecting the frequency at which the DDS operates and the time for which the frequency is the unlit-discharge resonant frequency $f_{UL}$. OR-gate 56 communicates the laser-ON command or the output of MSMV 54 to the DDS for providing an RF ON/OFF signal. MSMV 52 is a positive-edge (of a command signal or pulse) triggered device. MSMV 54 is negative-edge (of a command signal or pulse) triggered device. The manner in which the MSMVs operate cooperatively as timers is described in detail further hereinbelow.

Figure 1C:
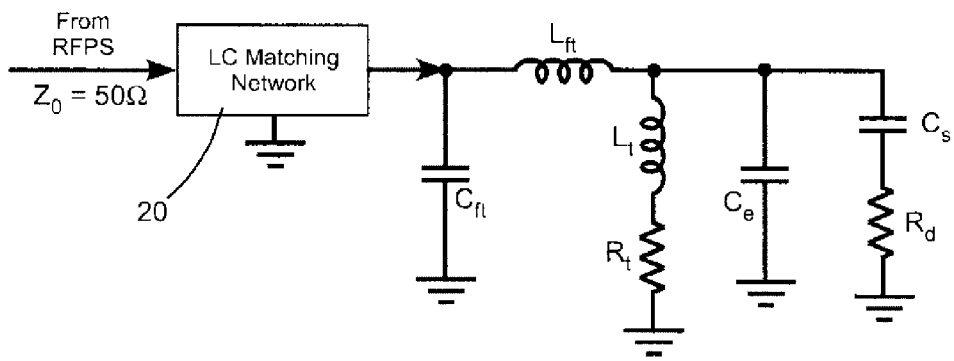
FIG. 1C schematically illustrates an equivalent electronic circuit of the electrode assembly of FIG. 1A when the RF power to the electrode assembly lights and sustains a discharge in the laser-gas.
Figure 2A:
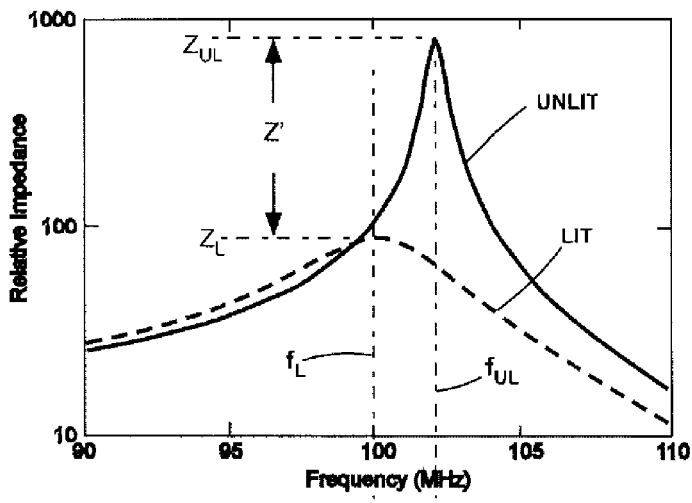
FIG. 2A is a graph schematically illustrating the form of relative impedance of the electrode assembly of FIG. 1A for the unlit-discharge and lit-discharge conditions.
Figure 2B:
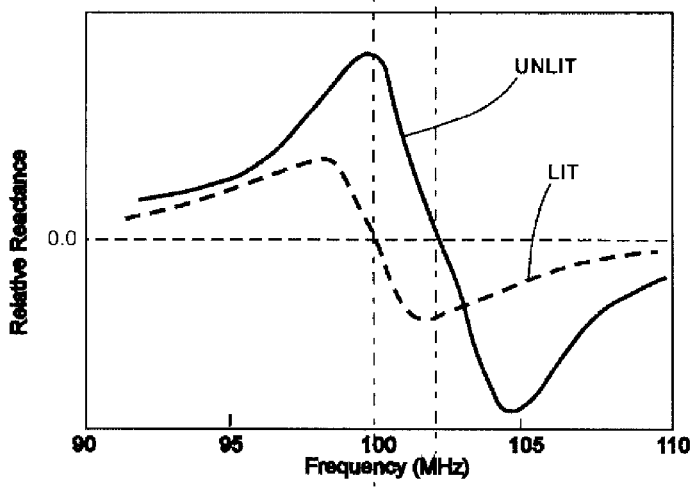
FIG. 2B is a graph schematically illustrating the form of relative impedance of the electrode assembly of FIG. 1A for the unlit-discharge and lit-discharge conditions of the electrode assembly.
Figure 2C:
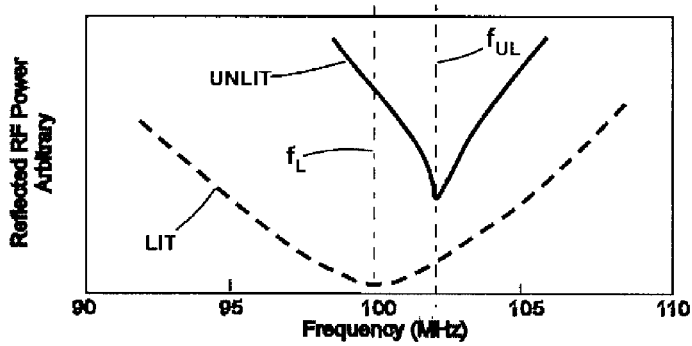
FIG. 2C is a graph schematically illustrating the form of reflected RF power from the impedance matching network of the laser of FIG. 1A for the unlit-discharge and lit-discharge condition of the electrode assembly.

In one preferred method of operating the laser, the RF frequency corresponding to the minimum of the unlit-discharge curve of FIG. 1C, i.e., the minimum reflected RF power, and the RF frequency corresponding minimum of the lit-discharge curve of FIG. 1C are determined. These determinations are preferably performed by a manufacturer of the laser before the laser is delivered to a user. A signal to perform the search for these frequencies is illustrated in FIG. 3 as being delivered via a fixed connection 58 to microprocessor 46. Alternatively, the signal can be provided by a temporary connection to the microprocessor. The search is preferably carried out after tuning-inductors of the laser, corresponding to inductor $L_t$ of FIG. 2, have been adjusted by the manufacturer for a desired voltage-flatness along the length of the electrodes.

When microprocessor 46 is commanded (by whatever means) to initiate the frequency search, i.e., to go into a search mode, the microprocessor steps the frequency of pulses delivered by DDS 42 over a predefined range, while monitoring the reflected power in first an unlit-discharge condition of the laser housing, and then in a lit-discharge condition. The reflected power values are communicated to the microprocessor from directional coupler sensor 50, as discussed above. The microprocessor calculates the reflected power as a fraction of the incident (forward) power. Frequencies at which the minimum reflected power is determined in the two conditions ($f_{UL}$ for the lit condition, and $f_L$ for the unlit condition, see FIG. 1C) are stored in electronic memory of microprocessor 46.

Preferably, the pulse width of the search mode RF pulses is maintained relatively short, especially for the unlit-discharge condition, to minimize thermal stress on the final amplifier of the RFPS caused by the reflected power from the unmatched load which is encountered during the search at non-minimum values. Keeping the RF pulses short prevents laser action (discharge lighting) while the unlit resonant frequency is being searched. While the lit-discharge resonant frequency is being determined, the pulses must be long enough to initiate and sustain laser action. By way of example, for determining the unlit-discharge frequency, pulses may be about 1 to 2 microseconds (µs) in duration, and for determining the lit-discharge frequency, pulses may be about 6 to 7 µs in duration.

As discussed above, even for lasers which have nominally the same electrode arrangement the unlit-discharge and lit-discharge resonant frequencies may be somewhat different. These frequencies can be affected by variations (within manufacturing tolerances) in the dielectric constant of the ceramic material spacing the electrodes, in the separation distance between the electrodes, in the closeness of the coils of the electrode tuning inductors ($L_t$), in the dimensions of the RF feed through, and in the variations in the values of the impedance matching network components.

Because of the Q of the electrode structure in an unlit-discharge condition is relatively high, errors in the determination of $f_{UL}$ can greatly influence the number of free electrons generated per-unit-time in the lasing gas between the electrodes and, accordingly, affect the ignition of the laser. Because of this, it is important to control the frequency of DDS 42 precisely in the search mode, in order to accurately locate the sharp minimum of reflected power. Determination of the resonant frequency in the lit-discharge condition does not need to be as precise because the Q of the electrode structure is lower in this condition.

A frequency sweep time for DDS 42 on the order of 5 to 10 seconds is usually sufficient to locate the unlit-discharge resonance frequency with adequate precision. Because of the lower Q in the lit-discharge condition, a shorter search time can be taken for locating the lit-discharge resonant frequency resonance.

Continuing with reference to FIG. 3 and with reference in addition to FIG. 4, in this example of operation of laser 40, a user delivers a command signal simultaneously to MSMVs 52 and 54 and OR gate 56 as noted above. The signal is positive-going (rising) at a time $T_0$ and negative-going (falling) at a time $T_2$ (see FIG. 4A) where $T_2$ minus $T_0$ equals $T_L$, and $T_L$ is the desired duration of an output pulse from the laser.

The rising edge of the command pulse is transmitted to DDS 42 via OR-gate 56 and turns the DDS, and accordingly RF power to the laser electrodes, on. The rising edge of the command pulse also triggers MSMV 52 into an unstable state and the MSMV 52 sends a signal to the DDS to select the stored frequency $f_{UL}$ from microprocessor and operate at that frequency. At a time $T_1$, MSMV 52 returns to a stable state (see FIG. 4B) and the DDS is switched to operate at the stored frequency $f_L$ for the lit-discharge condition (see FIG. 4D). $T_1$ minus $T_0$ is equal to $T_{UL}$ which is selected as discussed above to create sufficient free electrons to provide pre-ionization, without causing laser action.

Figure 4A:
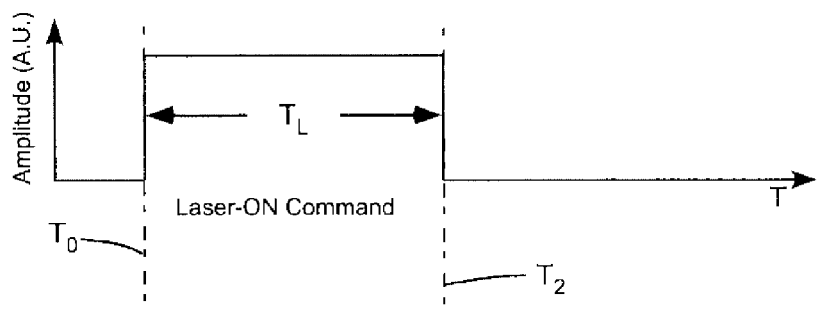
FIGS. 4A-E is a timing diagram schematically illustrating a preferred mode of operating the laser of FIG. 3 using the lit-discharge and unlit-discharge resonant frequencies determined and recorded by the electronic circuitry.
Figure 4B:
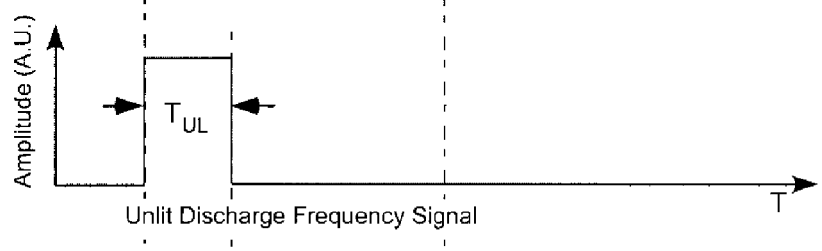
Figure 4C:
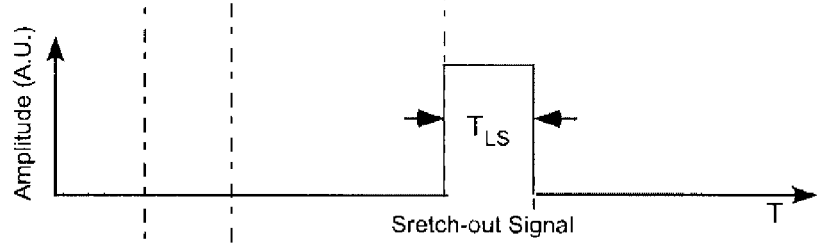
Figure 4D:
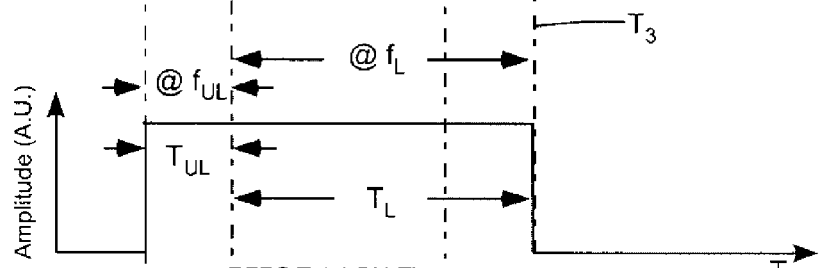
Figure 4E:
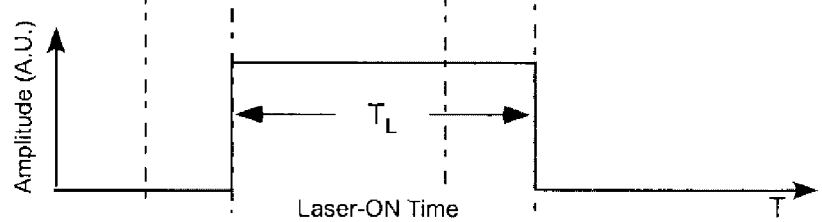

When DDS 42 is switched to the lit-discharge frequency $f_L$, laser action is initiated and the laser begins to delivers output radiation (see FIG. 4E). At time $T_2$, the falling edge of command pulse switches DDS 42 and accordingly RF output from RFPS 44 is turned off. However, essentially simultaneously, the falling edge of the command pulse also triggers MSMV 54 into an unstable state, and the MSMV delivers an ON-pulse to the DDS to sustain the RF output at frequency $f_L$ (see FIG. 4C). The terminology "essentially simultaneously", as used here, means that, as the switching times on and off for the DDS are finite, and greater than the switching delay of MSMV 54 and the lifetime of electrons in the lit discharge plasma, the RF power can be considered as continuously applied to the electrodes and the discharge stays lit.

At a time $T_3$, MSMV 54 returns to a stable state and the ON-pulse is terminated, which turns the DDS and RF output (at $f_L$) of RFPS 44 off (see FIG. 4D), and accordingly terminates laser action (see FIG. 4E). The difference between T3 and T2 is $T_{LS}$. $T_{LS}$ is made equal to $T_{UL}$, which provides that laser output is delivered for time $T_L$, i.e., the duration of the laser-ON command signal. Note that RF power is delivered to the laser electrodes for a total time equal to $T_L$ plus $T_{LS}$ (see FIG. 4D), but the RF power is only at the lit-discharge frequency $f_L$ for a period equal to $T_L$. A $T_L$ of about 7 μs is adequate for most $CO_2$-laser material-processing applications.

The switching time for the DDS is about 75 nanoseconds (ns) and, in this example, the switching time for the MSMVs is about 15 ns. The total switching time for the $f_L$ frequency generated by the DDS, including an OR-gate delay, is accordingly about 0.1 μs. This switching time is fast enough to be acceptable for generating sufficiently fast laser pulse rise and fall times for most $CO_2$-laser material processing applications.

The MSMV (chip) parts suitable for MSMVs 52 and 53 of FIG. 3 can be generic parts available from a number of suppliers as part number #74123. OR-gate (chip) 56 is also generic and commonly available from a number of suppliers as part number #7432. A DDS suitable for DDS 42 is commercially available from Analog Devices of Norwood, Mass. as model number AD9954. This DDS has a 32 bit phase accumulator and a 400 MHz clock and can achieve a 0.09 Hertz frequency reset-ability up to 200 MHz. This reset-ability is more than adequate for finding the frequencies $f_{uL}$ and $f_L$ to the accuracy required for ease of free electron generation and igniting the discharge. A microprocessor suitable for microprocessor 46 is available from Microchip Technology Inc. of Chandler, Ariz. as model number 18F4680. Directional couplers suitable for directional coupler sensor 50 are available from a number of commercial suppliers.

It has been assumed in this description that the bandwidth of the RFPS is sufficient to amplify both frequencies $f_{uL}$ and $f_L$. Various RFPS can be designed by those skilled in the electronics art that would have the bandwidth to accommodate both frequencies. One such power supply is described in detail in U.S. Pre-Grant Publication No. 20080204134, assigned to the assignee of the present invention and the complete disclosure of which is hereby incorporated herein by reference.

Those skilled in the electronic art will recognize from the description of the present invention provided above, that functions of the electronic circuitry depicted in FIG. 3 may be carried out by components and arrangements thereof other that those depicted and described. Any such components and arrangements for providing the inventive functions may be deployed without departing from the spirit and scope of the present invention.

Those skilled in the art will also recognize that the present invention may possibly be implemented without determination of the lit-discharge resonant frequency by the microprocessor, as the low Q in the lit-discharge condition provides for a broad minimum of reflected power which may encompass most variations thereof from laser to laser. In this case, a median lit-discharge resonant frequency value may be selected and programmed into the microprocessor. However, given that the electronic means are available for determining the actual resonant frequency, and that the determination takes a very short time, there is no compelling reason not to make the determination and enjoy the full benefit of the present invention.

In summary, the present invention is described above in terms of a preferred embodiment. The invention is not limited, however, by the embodiment described and depicted. Rather the invention is limited only by the claims appended hereto.

What is claimed is:

1. A gas discharge laser, comprising:
a laser housing including a laser gas and an electrode-assembly for lighting a discharge in the laser gas, the electrode assembly having a first resonant frequency when the discharge is not lit, and a second resonant frequency when the discharge is lit; and
electronic circuitry arranged to optimize at least the first resonant frequency, wherein the electronic circuitry optimizes the first resonant frequency by causing multiple RF pulses having a duration insufficient to light the discharge at a plurality of different frequencies within the frequency-range of the source while detecting the reflected RF power, and recording the frequency for which the detected reflected power is at a minimum value as the optimized first resonant frequency, the electronic circuitry further arranged to apply RF power to the electrodes at the optimized first resonant frequency for a first predetermined pulse width insufficient to light a discharge in the laser gas but sufficient to create sufficient free electrons in the gas to facilitate lighting of the discharge, and thereafter light the discharge by applying RF power to the electrodes at the second resonant frequency.

2. The laser of claim 1, wherein the electronic circuitry applies the RF power to the electrode assembly at the second resonant frequency for second pulse width longer than the first pulse width.

3. The gas discharge laser of claim 1, wherein the electronic circuitry includes an RF frequency source for delivering an RF signal selectively variable within a range including the first and second frequencies, an RF power amplifier arranged to amplify the signal delivered by the RF frequency source, the RF power amplifier being connected via an impedance matching network to the electrode assembly for applying the RF power, a sensor located between the RF power supply and the impedance matching network for monitoring reflected RF power from the impedance matching network, a microprocessor in electronic communication with the sensor and the RF frequency source.

4. The gas discharge laser of claim 3, wherein the RF frequency source is a digitally derived RF frequency source.

5. The gas discharge laser of claim 3 wherein, for optimizing the first resonant frequency the microprocessor is arranged to command the RF frequency source to deliver RF pulses having a duration insufficient to light the discharge at a plurality of different frequencies within the frequency-range of the source while detecting the reflected RF power monitored by the sensor, and to record the frequency for which the detected reflected power is at a minimum value as the optimized first resonant frequency.

6. The laser of claim 3 wherein the electronic circuitry further includes first and second timing devices responsive to a command signal having a rising edge and a falling edge and a duration equal to the desired duration of laser radiation with each of the timing devices being in electronic communication with the RF frequency source and with the RF frequency source also being responsive to the command signal, wherein, in response to the rising edge of the command signal, the RF frequency source and the first timing device initiate application of RF power at the first resonant frequency, the first timing device switches the frequency of the RF frequency source from the first resonant frequency to the second resonant frequency to apply RF power at the second resonant frequency to light the discharge, and wherein in response to the falling edge of the command signal the second timing device terminates application of RF power to the electrode assembly at the second resonant frequency after a second time period following initiation of the application at the second resonant frequency and equal to the duration of the command pulse.

7. The laser of claim 6, wherein the first timing device is a first monostable multivibrator (MSMV) and the second timing device is a monostable multivibrator cooperative with a logic OR-gate.

8. The laser of claim 1, wherein the electronic circuitry is also arranged to optimize the second resonant frequency.

9. The gas discharge laser of claim 8, wherein the electronic circuitry includes a RF-frequency source for delivering a signal having a frequency selectively variable within a range including the first and second frequencies, an RF power amplifier arranged to amplify the signal delivered by the electronic pulse source, the RF power amplifier being connected via an impedance matching network to the electrode assembly for applying the RF power, a sensor located between the RF power supply and the impedance matching network for monitoring reflected RF power from the impedance matching network, and a microprocessor in electronic communication with the sensor and the pulse source.

10. The gas discharge laser of claim 9 wherein, for optimizing the first resonant frequency the microprocessor is arranged to command the RF frequency source to deliver RF pulses having a pulse width insufficient to light the discharge at a plurality of different frequencies within the frequency-range of the RF frequency source while detecting the reflected RF power monitored by the sensor, and to record the frequency for which the detected reflected power is at a minimum value as the first resonant frequency.

11. The gas discharge laser of claim 10 wherein, for optimizing the second resonant frequency the microprocessor is arranged to command the RF frequency source to deliver RF pulses having a second pulse width sufficient to light and sustain a discharge at a plurality of different frequencies within the frequency-range of the source while detecting the reflected RF power monitored by the sensor, and to record the frequency for which the detected reflected power is at a minimum value as the second resonant frequency.

12. A gas discharge laser, comprising:
a laser housing including a laser gas and an electrode-assembly for lighting a discharge in the laser gas, the electrode assembly having a first resonant frequency when the discharge is not lit, and a second resonant frequency when the discharge is lit;
electronic circuitry including an RF power supply arranged to deliver RF power at an RF frequency selectively variable within a range including the first and second frequencies, the RF power supply being connected via an impedance matching network to the electrode assembly for applying the RF power to the electrode assembly, a sensor located between the RF power supply and the impedance matching network for monitoring reflected RF power from the impedance matching network, a microprocessor in electronic communication with the sensor and the RF power supply, the microprocessor being arranged to command the RF power supply to deliver RF pulses having a pulse width insufficient to light the discharge at a plurality of different frequencies within the frequency-range of the source while detecting the reflected RF power monitored by the sensor, and to record the frequency for which the detected reflected power is at a minimum value at the first resonant frequency;
and wherein the electronic circuitry is arranged to apply RF power to the electrodes at the recorded first resonant frequency for a first predetermined time period insufficient to light a discharge in the laser gas but sufficient to create sufficient free electrons in the gas to facilitate lighting of the discharge, and thereafter light the discharge by applying RF power to the electrodes at about the second resonant frequency.

13. The laser of claim 12, wherein the electronic circuitry applies the RF power at the second resonant frequency to the electrode assembly for second time period longer than the first time period.

14. The gas discharge laser of claim 12 wherein, the microprocessor is further arranged to command the RF power supply to deliver pulses having a second duration sufficient to light and sustain a discharge at a plurality of frequencies within the frequency-range of the source while detecting the reflected RF power monitored by the sensor, and to record the frequency for which the detected reflected power is at a minimum value at the second resonant frequency.

15. The laser of claim 12 wherein the electronic circuitry further includes first and second timing devices responsive to a command signal having a rising edge and a falling edge and a duration equal to the desired duration of laser radiation and with each of the timing devices being in electronic communication with the RF power supply and with the RF power supply also being responsive to the command signal, wherein, in response to the rising edge of the command signal, the RF power supply and the first timing device initiate application of RF power at the first resonant frequency, the first timing device switches the frequency of the RF power supply from the first resonant frequency to the second resonant frequency to apply RF power at the second resonant frequency to the electrode assembly to light the discharge, and wherein the in response to the falling edge of the command signal the second timing device terminates application of RF power to the electrode assembly at the second resonant frequency after a second time period following initiation of the delivery at the second resonant frequency and equal to the duration of the command pulse.

16. The apparatus of claim 12, wherein the RF power supply includes a digitally derived RF frequency source for delivering a signal having a frequency selectively variable within a range of RF frequencies including the first and second resonant frequencies, and an RF amplifier to amplify the signal from the pulse source.

17. A method of operating a gas discharge laser, the laser including a laser housing including a laser gas and an electrode-assembly for lighting a discharge in the laser gas, the electrode assembly having a first resonant frequency when the discharge is not lit, and a second resonant frequency when the discharge is lit, the laser including an RF power supply capable of delivering RF pulses at a RF frequency selectively variable within a range of frequencies including the first and second frequencies, the RF power supply being connected via an impedance matching network to the electrode assembly for applying the RF power to the electrode assembly, the method comprising the steps of:
- (a) monitoring reflected RF power from the impedance matching network while delivering RF pulses at a plurality of different frequencies within the frequency-range of the power supply and having the first duration insufficient to light a discharge in the laser gas;
- (b) recording the RF frequency for which the detected reflected power is at a minimum value at the first resonant frequency;
- (c) applying RF power to the electrodes at the recorded first resonant frequency for a first predetermined time period insufficient to light a discharge in the laser gas but sufficient to create sufficient free electrons in the gas to facilitate lighting of the discharge; and
- (d) thereafter lighting the discharge by applying RF power to the electrodes at about the second resonant frequency.

18. The method of claim 17, further including the steps of (e) monitoring reflected RF power from the impedance matching network while delivering RF pulses at a plurality of frequencies within the frequency-range of the power supply and having a second duration sufficient to light and sustain a discharge in the laser gas, and (f) recording the RF power for which the reflected power is at a minimum at the second resonant frequency, and wherein the second resonant frequency of step (d) is the recorded second resonant frequency.

19. A method of operating an RF excited gas discharge laser, said laser including a housing for holding a laser gas and an electrode assembly for lighting the discharge, said laser further including an RF power supply for energizing the electrodes assembly, said method comprising the steps of:
- (a) supplying a first RF pulse having a first RF frequency to the electrodes, the first RF pulse having a duration insufficient to light the discharge but to create sufficient free electrons in the gas to facilitate subsequent lighting of the discharge;
- (b) supplying a second RF pulse having a second RF frequency to the electrodes, the second RF pulse having a duration sufficient to light the discharge; and
- (c) repeating steps (a) and (b) to generate a series of laser pulses and wherein the first RF frequency of the RF pulse supplied in step (a) is selected to minimize the RF power reflected back towards the power supply.

20. A method as recited in claim 19 wherein said RF frequency of the RF pulse supplied in step (a) is selected during a test phase wherein the electrodes are supplied with pulses of varying RF frequency while the RF power reflected back towards the power supply is monitored to determine the RF frequency which minimizes the reflected power.

21. A gas discharge laser, comprising:
- a laser housing including a laser gas and an electrode-assembly for lighting a discharge in the laser gas, the electrode assembly having a first resonant frequency when the discharge is not lit, and a second resonant frequency when the discharge is lit; and
- electronic circuitry including:
  - a microprocessor for setting an RF frequency; and
  - a digital frequency synthesizer for producing an RF signal selectively variable within a range of frequencies, the frequency of the RF signal being set by the microprocessor,
    - wherein the electronic circuitry is arranged to optimize the first and second resonant frequencies, apply RF power to the electrodes at the optimized first resonant frequency for a first predetermined pulse width insufficient to light a discharge in the laser gas but sufficient to create sufficient free electrons in the gas to facilitate lighting of the discharge, and thereafter light the discharge by applying RF power to the electrodes at the optimized second resonant frequency.

* * * * *